US009294913B1

(12) United States Patent
Lauff et al.

(10) Patent No.: US 9,294,913 B1
(45) Date of Patent: *Mar. 22, 2016

(54) ANDROID-BASED SECURE HANDHELD NETWORK ACCESS DEVICE AND MICRO-USB VERSION OF IEEE 802.15.4 BRIDGE FOR ACSD NETWORKS

(71) Applicant: SPAWAR Systems Center Pacific, San Diego, CA (US)

(72) Inventors: Sarah M. Lauff, San Diego, CA (US); Cory T. Sohrakoff, San Diego, CA (US); Alex G. Phipps, San Diego, CA (US)

(73) Assignee: The United States of America as repressented by Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,609

(22) Filed: Sep. 26, 2014

Related U.S. Application Data

(63) Continuation-in-part of application No. 14/067,579, filed on Oct. 30, 2013, now abandoned, and a continuation-in-part of application No. 13/225,597, filed on Sep. 6, 2011, now Pat. No. 8,855,311, and a continuation-in-part of application No. 13/195,916, filed on Aug. 2, 2011, now Pat. No. 8,607,049.

(51) Int. Cl.
*H04K 1/00* (2006.01)
*H04W 12/02* (2009.01)

(52) U.S. Cl.
CPC .................................... *H04W 12/02* (2013.01)

(58) Field of Classification Search
CPC . H04W 40/24; H04W 74/0808; H04W 84/18; H04W 8/005; G06F 1/3203
See application file for complete search history.

(56) References Cited

U.S. PATENT DOCUMENTS

| 2007/0009104 | A1* | 1/2007 | Renkis | G08B 13/19615 380/270 |
| 2008/0160928 | A1* | 7/2008 | Tsfaty | H04H 60/13 455/77 |
| 2009/0125957 | A1* | 5/2009 | Singh | H04N 21/41 725/111 |
| 2009/0193109 | A1* | 7/2009 | Kuo | H04L 69/323 709/223 |
| 2010/0189082 | A1* | 7/2010 | Choi | H04W 64/00 370/336 |
| 2013/0218983 | A1* | 8/2013 | Richard | H04W 12/02 709/206 |

\* cited by examiner

*Primary Examiner* — Nirav B Patel
*Assistant Examiner* — Mohammed Waliullah
(74) *Attorney, Agent, or Firm* — SPAWAR Systems Center Pacific; Kyle Eppele; J. Eric Anderson (57) ABSTRACT

This disclosure focuses on the development of a micro-usb module that allows a smart-device to transmit and receive IEEE 802.25.4 messages via a connection through the phone's micro-usb slot without the need for an additional external battery. This disclosure focuses on the implementation of the ACSD Protocols through the use of a Secure Handheld Network Access Device (HNAD). The functional goal of a Secure Handheld Network Access Device (HNAD) is to provide a bidirectional wireless RF communication interface to Security Devices, based upon IEEE Standard 802.15.4-2006 physical and data link layer protocols.

20 Claims, 4 Drawing Sheets

Android-based smartphone as the Secure Handheld Network Access Device
(HNAD)

Figure 1: Android-based smartphone as the Secure Handheld Network Access Device (HNAD)

Figure 2: NAD Operations with the DCP

Figure 3: Host Mode

Figure 4: Micro-usb module

FIGURE 5

ANDROID-BASED SECURE HANDHELD NETWORK ACCESS DEVICE AND MICRO-USB VERSION OF IEEE 802.15.4 BRIDGE FOR ACSD NETWORKS

FEDERALLY-SPONSORED RESEARCH AND DEVELOPMENT

This invention (Navy Case NC 103,393) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

CROSS-REFERENCE TO RELATED APPLICATIONS

The present application is related to application Ser. No. 14/067,579, filed Oct. 30, 2013 entitled SECURE HANDHELD NETWORK ACCESS DEVICE (HNAD) FOR USE WITH ACSD NETWORKS (NC 101,453); Ser. No. 13/225,597, filed Sep. 6, 2011, entitled ADVANCED CONTAINER SECURITY DEVICE NETWORK PROTOCOLS (NC 100,704); Ser. No. 13/195,916, filed Aug. 2, 2011, entitled NETWORK ACCESS DEVICE FOR A CARGO CONTAINER SECURITY NETWORK (NC 101,017), now U.S. Pat. No. 8,607,049, issued Dec. 10, 2013, all of which are assigned to the same assignee as the present application, and the details of which are hereby incorporated by reference

BACKGROUND

Previously, both private industry and government agencies have investigated ways to improve security in the global supply chain in an effort to protect against criminal activity and terrorist attacks. This has included development of improved mechanical and electronic container seal technology, as well the development of sensor networks and inspection agreements/processes to identify and monitor cargo movement at major ports and transit points throughout the world. In anticipation of new U.S. Government policies on enhanced security requirements for all U.S.-bound cargo, various government and industry teams have been investigating ways to adapt existing technologies and processes to provide monitoring of containers and other conveyances from the Point of Stuffing (PoS) to the Point of Deconsolidation (PoDC). The use of Security Device Systems in the global supply chain is one component of an improved national security posture. The Secure Handheld Network Access Device (HNAD) described here-in adheres to the formal requirements for Security Devices consistent with the Department of Homeland Security's (DHS's) security needs and operations, while considering the shipping industry's operational needs.

SUMMARY

A wireless bridge for wireless to TCP/IP based communication acting as a network access device (NAD) for an advanced container security device (ACSD) network, the network address device comprising an Android-based handheld network access device including a micro-USB port; a processor with memory; a radio frequency transceiver front end communicating with the processor; an antenna coupled to the front end; and a power source providing power to the processor and front end wherein the processor with memory containing computer instructions for executing IEEE 802.15.4 standard compliant operations; transmitting a network access device announcement (NADA) message representative of the initiation of passive network discovery to multiple end devices; determining whether a designated end device is network compliant; establishing communication with the compliant designated end device; and forwarding the NADA message to the designated end device; implementing a set of air interface protocols on the wireless side that allow for network discovery and status message exchanges with end devices whose addresses are not pre-programmed into the access device in advance in a connectionless manner; supporting network discovery and status message exchange requirements for end devices randomly moving in and out of network access device coverage; implementing a set of reduced medium access control (MAC)-layer messaging protocols to minimize RF channel traffic and coexistence with commercial standard 802 systems, and a micro-USB module for connecting the ACSD network with the Android-based device via the micro-USB port.

BRIEF DESCRIPTION OF THE DRAWINGS

Throughout the several views, like elements are referenced using like references, wherein.

DETAILED DESCRIPTION OF THE EMBODIMENTS

This disclosure focuses on the development of a micro-usb module that allows a smart-device to transmit and receive IEEE 802.25.4 messages via a connection through the phone's micro-usb slot without the need for an additional external battery. This disclosure focuses on the implementation of the ACSD Protocols (the above cross-referenced Navy Case NC 100,704) through the use of a Secure Handheld Network Access Device (HNAD). The functional goal of a Secure Handheld Network Access Device (HNAD) is to provide a bidirectional wireless RF communication interface to Security Devices, based upon IEEE Standard 802.15.4-2006 physical and data link layer protocols.

The Advanced Container Security Device (ACSD) Network and Security Protocols provide system and component technical requirements for Department of Homeland Security (DHS) Advanced Container Security Device (ACSD) System. This system is inclusive of the Container Security Device (CSD), Marine Asset Tag Tracking System (MATTS) as well as the Electronic Chain of Custody (ECoC) concepts and technologies. DHS is currently conducting an integrated research, development, test, and evaluation program to develop secure supply chains through the implementation of the ACSD technologies. This effort includes future data and communications architecture, portable inspection systems, advanced trade data collection, advanced targeting systems, cargo tracking and tagging systems, Electronic Chain of Custody Devices (ECoCs), Container Security Devices (CSDs)

and Advanced Container Security Devices (ACSDs). The primary emphasis of the program is to assure the physical security of the container/conveyance (and its contents), specifically directed at the detection of unauthorized opening, closing, or removal of the doors, penetration of any of the six sides, and human presence. Of secondary importance are detection of the container/conveyance's location, and the recording of container/conveyance interactions. The security device must survive the rigors of intermodal transport, especially the marine environment.

As described above, this disclosure focuses on the implementation of the ACSD Protocols (the above cross-referenced Navy Case NC 100,704) through the use of a Secure Handheld Network Access Device (HNAD). The functional goal of a Secure Handheld Network Access Device (HNAD) is to provide a bidirectional wireless RF communication interface to Security Devices, based upon IEEE Standard 802.15.4-2006 physical and data link layer protocols.

Throughout this disclosure, the word smart-device refers to any smartphone and tablet platforms including Windows, webOS, MeeGo, and others.

The Secure Handheld Network Access Device (HNAD) described here-in provides a bidirectional wireless RF communications interface to Security Devices, based upon IEEE Standard 802.15.4-2006 physical and data link layer protocols. The HNAD is the link for data and command transmission between Security Devices and the operator or a Data Consolidation Point (DCP). An HNAD may be any appropriate mix of hardware, software, and internal interfaces that satisfy the functional requirements and user interface requirements specified for a HNAD application.

The NAD implementations supporting Advanced Container Security Device (ACSD)/Container Security Device (CSD)/Electronic Chain of Custody (ECoC) and Marine Asset Device Tracking System (MATTS) Networks range from completely transparent Non-secure NADs (see the above cross-referenced Navy case NC 101,017) to Secure NADs. Non-secure NADs pass messages to and from a DC without modification as part of the un-trusted network. Generally speaking, these are in fixed locations that do not assume the presence of, or access control by, a trusted agent. NADs implemented as fixed installations (not portable) as part of the un-trusted network are referred to as Fixed NADs (FNADs). FNADs are always mains-powered. At the other functional extreme are Secure NADs that possess authorizing credentials that allow them to issue restricted commands and access encrypted messages and log files in the same fashion as a Data Center. These devices are intended to always be in the possession and complete control of a trusted agent and as such are most likely to be portable (handheld) NADs (HNADs). HNADs can be either Secure or Non-secure NADs but in all cases are battery powered.

All NADs support the following tasks:
Identify Security Devices in their RF communication range,
Establish a wireless network connection with the Security Devices,
Deliver Security Device Commands to the Security Device,
Acquire Security Device Status Messages and Security Device Event Logs, and
Communicate Security Device Status Messages and Security Device Event Logs to the assigned Data Consolidation Point.

Figure 1:
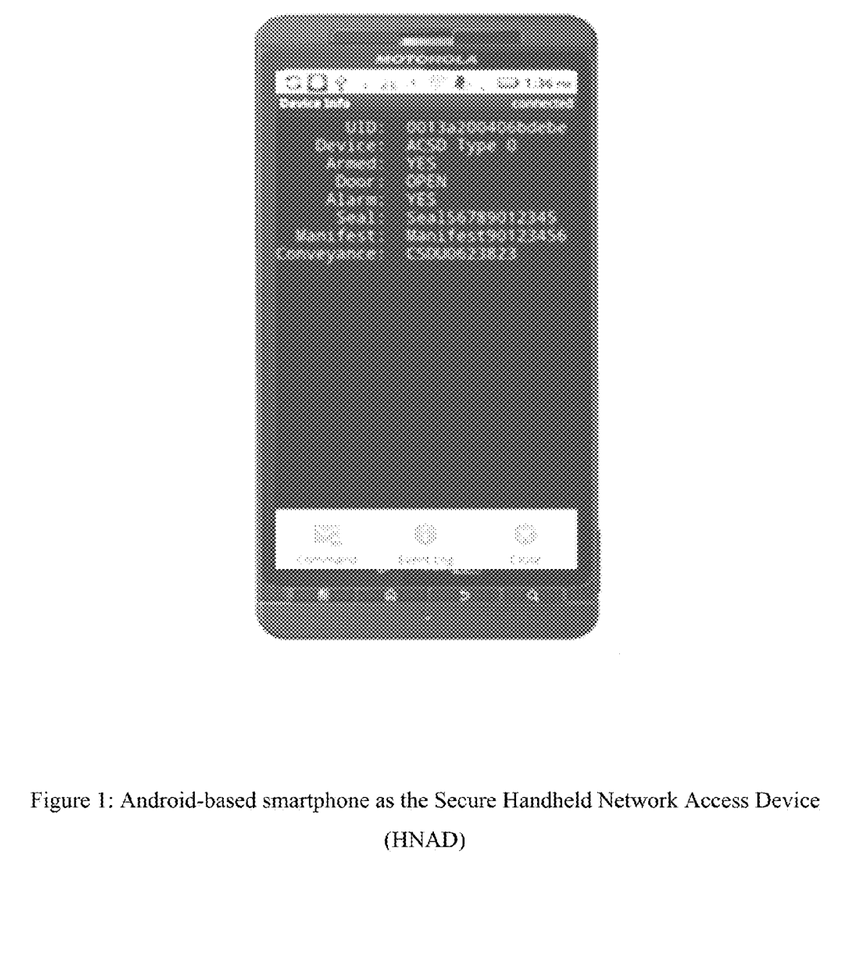
FIG. 1 shows an implementation of an Android-based smartphone as the Secure Handheld Network Access Device (HNAD).

FIG. 1 shows an implementation of an Android-based smartphone as the Secure Handheld Network Access Device (HNAD). The Secure Handheld Network Access Device (HNAD) will be able to connect to both the Data Consolidation Point (DCP) and the ACSD.

Communication Between the HNAD and Data Center:
Initially, a verified user will log on to the smart-device that acts as the Secure Handheld Network Access Device (HNAD). The Secure HNAD will then establish a secure connection to the Data Consolidation Point (DCP) to receive container-specific encryption keys from the Key Management Facility via the Data Consolidation Point (DCP). When the Secure HNAD has an individual security device's key, they will be able to connect to and read all messages sent by that container. The HNAD will also be able to use the key in order to send its own initiated messages back to the container. When finished, the verified user can connect to the DCP and upload Secure HNAD's data. The connection between the HNAD and the Data Center can be made via a cradle connection, Ethernet, or wifi.

Figure 2:
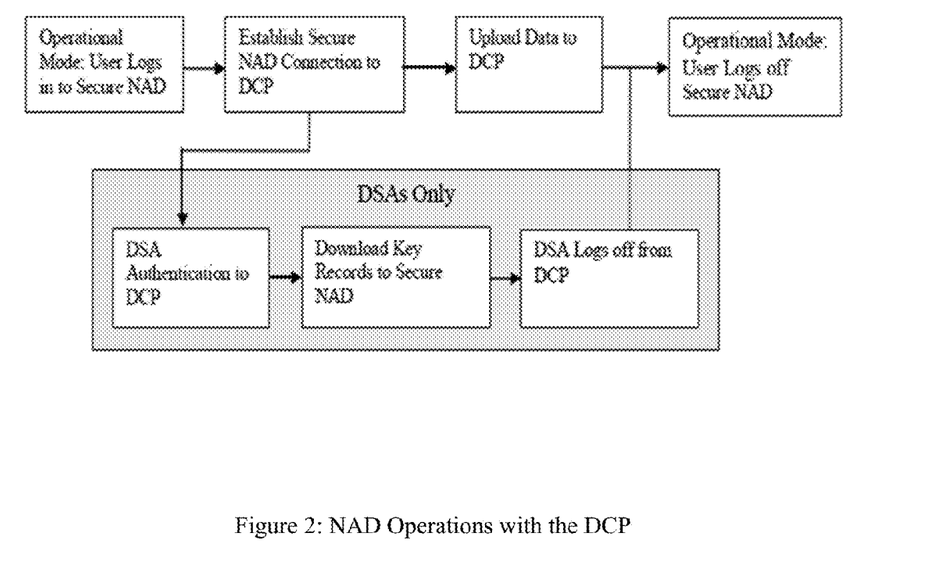
FIG. 2 shows a view of NAD operations with the Data Consolidation Point (DCP).

FIG. 2 shows the overview of the connection of the Secure HNAD to the DCP, where DSA means Designated System Administrator.

Communication Between the HNAD and ACSD:
The secure HNAD is used by DHS-designated security agents to support the filed operation of conveyances equipped with security devices. The secure HNAD does not require a real-time or persistent connection to the DCP in order to communicate and operate with a security device. The secure HNAD does require a secure connection to download the security device-specific encryption key from a DCP that enables it to read the status and log files from, and successfully send secure commands to, that security device.

The secure HNAD in the Autonomous Configuration shall allow the user to:
Establish wireless communications with multiple Security Device's within the local RF range of the secure HNAD.
Select specific Security Device's for interrogation and operation
Acquire and display Security Device status data
Generate commands to operate the Security Device through all modes and states and/or to alter the Security Device trip information.

All secure NADs shall provide the logged-in user the ability to:
Query and receive data from the Security Devices
Transmit status and command data verbatim between a Security Device and a DCP
Store and view all Security Device non-secure and secure data
Issue unrestricted status commands without real-time connection to a DCP
Issue restricted commands without real-time connection to a DCP, with the exception of Rekey commands
Store and view Security Device Encrypted Security Data
Upload secure Activity Logs and other information to the Data Consolidation Point
Download Encryption Key and key records from the Data Consolidation Point.

Secure Handheld Network Access Device:
The main function of the smart-device HNAD software is to connect the smart-device to a security device network, using the ACSD protocol defined in the Interface Control Document (ICD) to communicate with security devices. Currently, however, there are no existing smart-devices with an IEEE 802.15.4 network interface. Our initial solution to this was to create an external network adapter designed to bridge an IEEE 802.15.4 wireless connection with a communication protocol that the smart-device supports, such as Bluetooth or Wifi. Once connected to the ACSD network, the Android application is then able to communicate with security devices via the network bridge using the ICD-defined protocol.

NC 101,453 focused on developing an IEEE 802.15.4-to-Bluetooth network bridge. This device implements the physical and MAC layers of the ACSD network and facilitates communication between the Bluetooth and IEEE 802.15.4 network interfaces. "Bridging" is defined here to be the forwarding of data packets from one network interface to another, in order to achieve connectivity between devices supporting differing communication protocols.

This patent focuses on the development of a micro-usb module that allows the smart-device to transmit and receive IEEE 802.25.4 messages via a connection through the phone's micro-usb slot.

The Secure Handheld Network Access Device (HNAD) has been developed in order to implement the ACSD Network Protocols (see the above cross-referenced Navy Case NC 100,704). The ACSD Network and Security Protocols (discovery, data formats and messaging procedures) are unique in that they provide a network extension to the internet providing full access to vendors who intend to support the DHS concept of cargo security.

The Secure HNAD described here-in implements the IEEE 802.15.4-2006 Standard to define the wireless air interface. Many Standards-compliant commercial off the shelf products exist for machine-to-machine communications. The key elements of this interface are the Medium Access Control (MAC) and the Physical Layer (PHY). The Non-secure NAD utilizes a specific configuration of the MAC and PHY. This standard MAC/PHY assures basic interoperability among multiple suppliers' devices.

However, for the use case topic of this document, key inadequacies of the IEEE 802.15.4 Standard exist as summarized in the list below; new and novel solutions to these inadequacies are given below.

Spontaneous Off-Premises Transmissions:

End devices that are mobile in nature, such as those that would be used on conveyances used in logistics (containers, etc.), are the Standard's mechanism for network discovery (i.e. detecting in-RF-coverage). End devices transmit a particular association request message to a candidate network access node to indicate a desire to join the network. This is known as "active" network discovery in that the device must transmit non-data (management) messages prior to sending user data. This methodology results in inefficient battery consumption and air time usage. When recurring unsolicited messages are transmitted to no avail (e.g. to probes) and not in areas of intended operation, a violation of some countries' spectrum usage regulations may occur.

Poll for Possible Waiting Data:

For mobile battery powered devices, the Standard defines that the device will transmit a poll message to a specific network node that may have queued messages held in queue while the end device was in a temporary power conservation state (not capable of receiving). Poll messages consume power and occupy precious air time in the RF channel.

RF Spectrum Scan for Network Discovery:

End devices scan all available RF channels to perform network discovery. This is inefficient as it increases battery consumption for mobile devices moving among the continents of the word.

Transmission Time Slot Requests:

For time-slot (TDMA) based use of the Standard, end devices must transmit initial and recurring management messages to request and renew time slots for transmissions. For mobile devices in poor RF conditions (such as the locales described in this document), these and other management messages become more numerous than the small user data messages. In poor conditions, the probability of successful delivery of user data messages is thus greatly diminished due to the prerequisite management messages.

Custom Beacon Message Content:

The Standard's beacon message may contain special content to convey that messages are held in queue ("message waiting") for end devices to discover, or other information. Commonly available, unaltered commercially available products do not expect beacon payload content. Placing such data into the beacons requires modification of commercial off the shelf Standards-compliant products' firmware which was base-lined after proof of compliance with the Standard by the product provider. Altering the product (a modem-like device) introduces risk and warranty invalidation.

Network Existence Broadcast Messages without Frame Collisions:

The Standard is such that adjacent access nodes that transmit recurring beacons to advertise coverage existence and the identity of each node must use independent channels to preclude data frame collisions in time. This then requires more scanning by end devices.

Limited Beacon Message Payload Size:

If this is used for sending a list of end devices for which there are message-waiting conditions, the use of the beacon limits the size of such data to less than it would be for a user data frame.

Network Existence Broadcast Messages with System Security:

The Standard lacks a practical means to advertise the existence of access devices along with a reference to which encryption key is required, given layer 3 encryption is used for end-to-end security. This is required for systems as described here for end device to final data center (crossing WANs and LANs), with encryption and decryption only by the end points, and in a connectionless manner.

Network Discovery Recurring Beacon Interval being Invariant.

End devices must be configured for a fixed time interval to assure signal detection congruent with battery conservation time cycles ("sleeping").

The inadequacies listed above are now addressed below and are implemented in the subject disclosure a proof.

Spontaneous Off-Premises Transmissions:

The Secure HNAD device enables mobile on-conveyance end devices (i.e. Security Devices) to perform passive (no transmissions) network discovery. To do so, each HNAD transmits a prescribed messsage called Network Access Device Advertisement (NADA) in accordance with the defined configuration of the Standard's MAC and PHY. End devices passively scan a defined subset of the Standard's RF channels to detect NADAs and choose the best quality signal among multiple HNADs. In doing so, the end device then sends a single encrypted data frame message destined for the data center that may require retransmissions across LANs and WANs. Thus, management messages, including spontaneous off-premises messages are eliminated in total.

Poll for Possible Waiting Data:

Polling to inquire about waiting messages is eliminated as follows. End devices receive the HNADs' NADA messages (as above) at network discovery, and thereafter, according to a battery conservation (wake-up) timing choice. Each NADA contains a list of end device identity codes, for devices that have undelivered messages (message waiting) at the HNAD. Multiple HNADs may hold the same message, to support end device mobility. The end device passively detects its identity in the list in the NADA. On detecting a message waiting for a given device, that device transmits one request message to the chosen HNAD to cause the waiting message content to be transmitted.

RF Spectrum Scan for Network Discovery:

End devices do not scan all available RF channels. A specific subset of channels is defined. The NADA message described above enables passive network discovery with optimal battery conservation.

Transmission Time Slot Requests:

The HNADs with NADA message content enable end devices to use the Standard's CSMA/CA for medium access rather than TDMA. Precise message latency management is thus not required, as is the purpose of TDMA time slots. The numerous undesired management messages for time slot acquisition and renewal are thus eliminated.

Custom Beacon Message Content:

The NADA message of the HNADs is used instead of the Standard's beacons. The NADA messages are ordinary user data messages. Commonly available commercial products need not expect beacon payload content be present. Therefore, no alteration of the Standards-compliant commercial products' firmware is needed. This eliminates the risks and warranty or life cycle support issues arising from altered commercial products used as an element of a larger device.

Network Existence Broadcast Messages without Frame Collisions:

The Standard's beacon transmissions are not used. Instead, the CSMA/CA coordinated NADA messages are used as described above.

Limited Beacon Message Payload Size:

The Standard's beacon transmissions are not used. Instead, the CSMA/CA coordinated NADA messages are used, with the full size user data payload size potential rather than the limited beacon payload size.

Network Existence Broadcast Messages with System Security:

The Standard addresses only layer 2 encryption with a shared-key mechanism. The NAD devices, and overall end to end system design, enables end to end encrypted messages to be exchanged by the end devices and the destination data center, using layer 3 encryption, independent of all kinds and sorts of transport networks in the LAN/WAN paths. The HNAD's NADA message content includes a code to indicate which undisclosed encryption key is required for communicating with the data center affiliated with a given HNAD. This enables a key unique to each end device so that compromise of an encryption key does not affect other end devices' security.

Network Discovery Recurring Beacon Interval being Invariant.

Each NADA message contains a definition of the time until the next (future) NADA will be transmitted. End devices use this to select a power conservation cycle time. Thus, the interval may vary from site to site and may vary in time length, according to needs such as optimizing battery power consumption strategies but with interoperability maintained among products and suppliers that use different strategies.

Collectively, the above list of mechanisms implemented in the Secure HNAD augment the use of the generic IEEE 802.15.4 Standard's MAC and PHY with the means to support interoperability, battery conservation, and the dynamics encountered in the logistics applications with mobile devices.

This disclosure may be used in conjunction with the networking requirements of the ACSD, CSD, ECOC and MATTS technologies. In addition, future references to the Munitions Security Device and Weapons Tracking Seal technologies are also related. Any network constructs that reference one or more of these efforts are intended to be subject to this patent disclosure including but not limited to home appliance networks, home security networks, medical and power monitoring networks and consumer electronics networks including toys and gaming. Other types of networks that are not regularly mentioned in literature that may be subject to this disclosure includes dynamic networks used for inventory of stored materials such as classified documents, weapons, munitions, hazardous materials and radioactive materials that need to be monitored for long periods of time.

Also, while the Secure Handheld Network Access Devices was developed on an Android platform, we have the ability to develop on other platforms.

Figure 3:
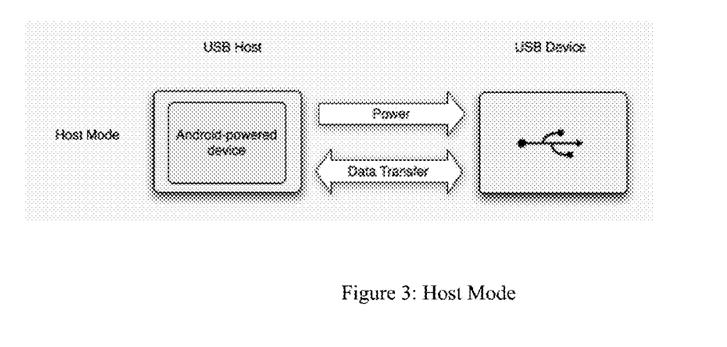
FIG. 3 shows USB host mode.
Figure 4:
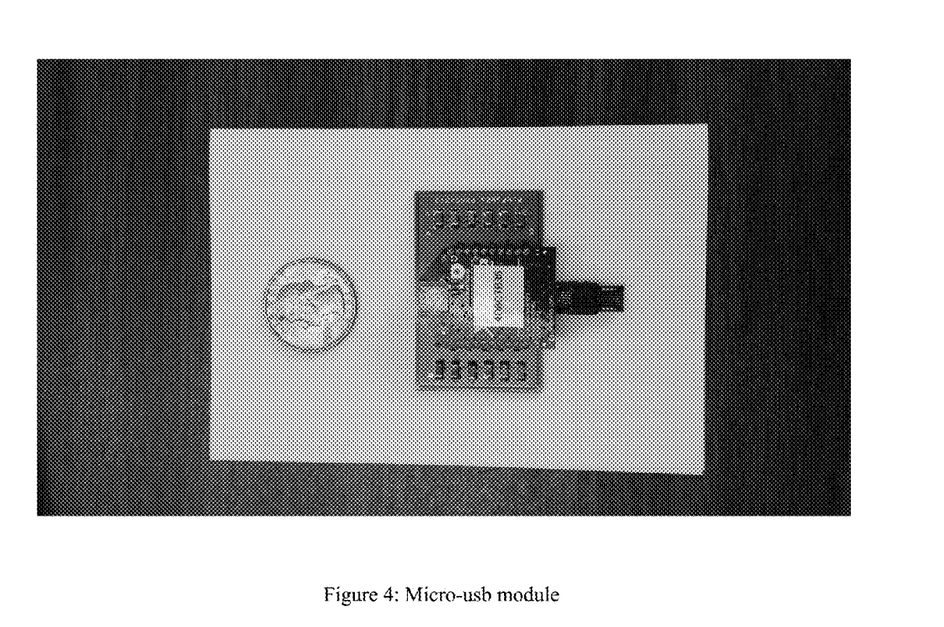
FIG. 4 shows a view of a micro-usb module.
Figure 5:
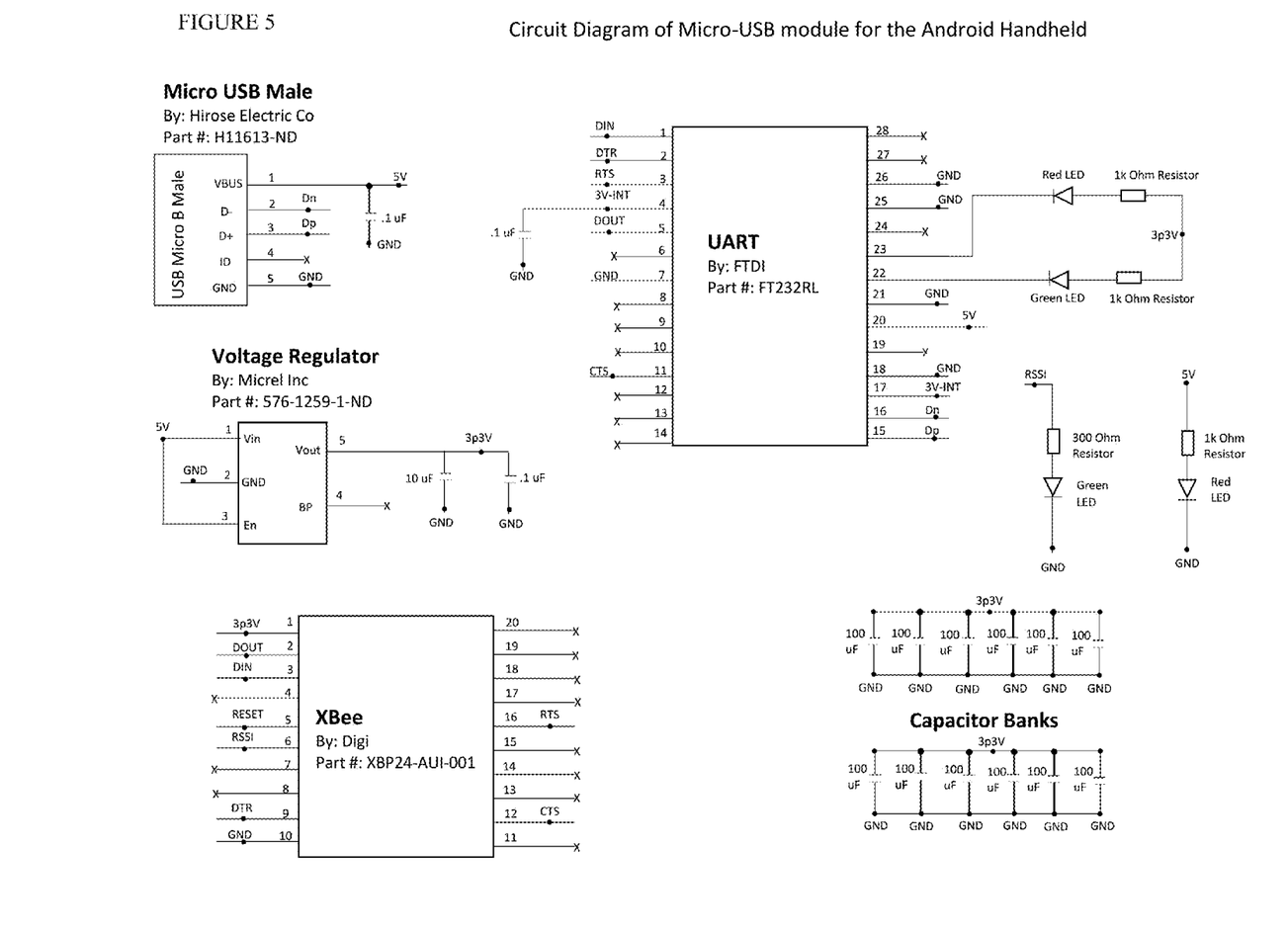
FIG. 5 shows a circuit schematic of a micro-usb module for the Android handheld device.

Android-based Secure Handheld Network Access Device (HNAD) and micro-USB version of the IEEE 802.15.4 bridge for use with ACSD networks Referring now to FIGS. 3-5, the purpose of the Android-Based HNAD software is to connect an Android device to an IEEE 802.15.4 network, and use the ACSD ICD protocol to communicate with security devices. However, currently, there are no Android devices with an IEEE 802.15.4 network interface. We solve this issue by utilizing an external hardware to bridge an Android smartphone to the IEEE 802.15.4 network by plugging into the phone's micro-USB port. Once connected to the network, the HNAD software is then able to communicate with security devices via the network bridge using the ICD protocol.

Android-based Secure Handheld Network Access Device:

The main function of the Android-based HNAD software is to connect an Android device to a security device network, using the ACSD protocol defined in the Interface Control Document (ICD) to communicate with security devices. This allows for a user to receive IEEE 802.15.4 messages to their phone and have the data displayed on the screen. Currently, however, there are no existing Android devices with an IEEE 802.15.4 network interface. We solve this issue by creating an external module that connects to the phone through its micro-USB port and communicates via the IEEE 802.15.4 wireless connection. Once connected to the ACSD network, the Android application is then able to communicate with security devices via the network bridge using the ICD-defined protocol.

In order to interface an Android device with the ACSD network, we designed an IEEE 802.15.4 micro-USB module that can pull enough power from the phone that another battery is not needed.

FIG. 3 shows that the phone needs to be in host mode. This means that the micro-USB module acts similarly to a USB device in which it is a slave to the phone. The phone must not only power the device, but it must also push/pull messages to/from the micro-USB module. All processing is done on the Android phone. The micro-USB module receives its power from the phone and transfers all 802.15.4 between the phone and the security device. This is a two-way transfer where both the phone and the security device can send messages to each other through the micro-USB bridge.

This micro-USB module connects into the micro-USB slot and can function with any Android 4.0+ version phone. Please note that the micro-USB module will fit in earlier phones, but the phone do not have the capability to handle communication to the micro-USB module. There are a total of 12 100 uF capacitors used as capacitor banks. These are needed due to the fact that when transmitting information, the IEEE 802.15.4 chip would need more power than the phone could provide. This micro-USB module also has a voltage regulator and a serial UART underneath the IEEE 802.15.4 chip. This module can be plugged into any Android +4.0 device, including tablets.

One benefit to having the micro-usb module instead of the Bluetooth bridge is that it ensures a connection between the phone and the bridge/module. When using the Bluetooth bridge, the user would often have to wait ~15 seconds until a connection was established between the phone and the bridge. With the micro-usb module, the connection is instantaneous. Another benefit to using the micro-usb module is that the charged phone provides the power to the module. For the Bluetooth version, the user would have two different power cords (one for the phone, and one for the bridge). Now, the user only has to consider charging one device.

FIG. 5 shows the schematics for the micro-usb module and the recommended hardware to build the module. This module pulls its power from the phone, and therefore removing the need for the module to have a battery of its own. However, when sending messages, the module needs more power than then phone can provide, therefore, we included a capacitor bank for the module to draw the extra needed power. This micro-usb module also contains an XBee module. This XBee allows for communication with any devices that communicate via IEEE 802.15.4. The IEEE 802.15.4 messages received via the XBee module pass through the FT232R USB UART and are then sent to the phone though the Data In/Data Out connections provided through the micro-usb connector. This module also has a MIC5205 voltage regulator to ensure the appropriate power and LEDs so that the user knows when the module has power and is receiving/transmitting messages. Please note, when plugging in the bridge, the phone must be in host mode.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A wireless bridge for wireless to TCP/IP based communication acting as a network access device (NAD) for an advanced container security device (ACSD) network, the network address device comprising:
   an Android-based handheld network access device including:
      a micro-USB port;
      a processor with memory;
      a radio frequency transceiver front end communicating with the processor;
      an antenna coupled to the front end; and
      a power source providing power to the processor and front end wherein
      the processor with memory containing computer instructions for executing IEEE 802.15.4 standard compliant operations;
         transmitting a network access device announcement (NADA) message representative of the initiation of passive network discovery to multiple end devices;
         determining whether a designated end device is network compliant;
         establishing communication with the compliant designated end device;
         and forwarding the NADA message to the designated end device;
         implementing a set of air interface protocols on the wireless side that allow for network discovery and status message exchanges with end devices whose addresses are not pre-programmed into the access device in advance in a connectionless manner;
         supporting network discovery and status message exchange requirements for end devices randomly moving in and out of network access device coverage;
         implementing a set of reduced medium access control (MAC)-layer messaging protocols to minimize RF channel traffic and coexistence with commercial standard 802 systems, and
   a micro-USB module for connecting the ACSD network with the Android-based device via the micro-USB port.

2. The device of claim 1 wherein the micro-USB module normally draws power from the Android-based device.

3. The device of claim 2 wherein the micro-USB module includes a capacitor bank for providing additional power when sending messages.

4. The device of claim 3, further comprising a module containing the instructions for IEEE 802.15.4 standard compliant operations, coupled to the processor.

5. The device of claim 3, wherein the front end is multi-frequency.

6. The device of claim 3, wherein the power source is either battery or mains powered.

7. The device of claim 3, wherein the computer instructions further comprise instructions for clear channel assessment.

8. The device of claim 3, wherein the computer instructions further comprise instructions for:
   selectively transmitting on a predetermined set of radio frequency channels for network discovery;
   responding to a data center.

9. The device of claim 3, wherein the computer instructions further comprise instructions for:
   forwarding from an end device to a data center;
   receiving a matching identity code from the end device; and
   forwarding a waiting message from the data center to the end device.

10. The device of claim 3, wherein the computer instructions further comprise instructions for forwarding messages from a data center with different levels of encryption to end devices with matching encryption.

11. The device of claim 3, wherein the computer instructions further comprise instructions for going into a power conservation state based on next-time-of-transmission information from a received NADA message.

12. The device of claim 3, wherein the NAD is in wireless communication with another NAD.

13. The device of claim 3, wherein the NAD is in wireless communication with a data center.

14. The device of claim 13, wherein the data center is hosted in a network cloud.

15. A method for wireless to TCP/IP based communication in an Android-type handheld network access device (HNAD) for an advanced container security device (ACSD) network where the HNAD includes a micro-USB port and a micro-USB module bridge for connecting the ACSD network with the HNAD via the micro-USB port; a processor with memory; a radio frequency transceiver front end communicating with the processor; an antenna coupled to the front end; wherein the processor with memory containing computer instructions for:
   executing IEEE 802.15.4 standard compliant operations;

transmitting a network access device announcement (NADA) message representative of the initiation of passive network discovery to multiple end devices from the HNAD;

determining whether a designated end device is network compliant;

establishing communication with the compliant designated end device;

and forwarding the NADA message to the designated end device;

implementing a set of air interface protocols on the wireless side that allow for network discovery and status message exchanges with end devices whose addresses are not pre-programmed into the access device in advance in a connectionless manner;

supporting network discovery and status message exchange requirements for end devices randomly moving in and out of network access device coverage;

implementing a set of reduced medium access control (MAC)-layer messaging protocols to minimize RF channel traffic and coexistence with commercial standard 802 systems.

16. The method of claim 15, wherein communication is multi-frequency.

17. The method of claim 15, further comprising clear channel assessment prior to transmission from the HNAD.

18. The method of claim 15, further comprising:

selectively scanning a predetermined set of radio frequency channels for network discovery and sending data to the end device.

19. The method of claim 15, further comprising:

forwarding an end device identity code via the NADA from a data consolidation point (DCP) to the end device;

receiving a matching end device identity code from the end device; and forwarding a waiting message from the HNAD to the end device.

20. The method of claim 15, further comprising forwarding messages from HNADs with different levels of encryption to end devices with matching encryption.

* * * * *